(12) United States Patent
Lee et al.

(10) Patent No.: US 10,279,779 B1
(45) Date of Patent: May 7, 2019

(54) VEHICLE AND CONTROL METHOD THEREOF

(71) Applicants: Hyundai Motor Company, Seoul (KR); Kia Motors Corporation, Seoul (KR)

(72) Inventors: Jihye Lee, Gangwon-do (KR); Dong June Song, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/949,213

(22) Filed: Apr. 10, 2018

(30) Foreign Application Priority Data

Nov. 10, 2017 (KR) .......................... 10-2017-0149455

(51) Int. Cl.
G08B 1/08 (2006.01)
B60R 25/25 (2013.01)
G06F 21/32 (2013.01)

(52) U.S. Cl.
CPC ............ B60R 25/252 (2013.01); G06F 21/32 (2013.01)

(58) Field of Classification Search
CPC ................................. G08B 21/24; G05B 19/00
USPC .... 340/539.12, 426.11, 5.2, 5.22, 5.25, 5.32, 340/5.6, 5.82, 5.83
See application file for complete search history.

(56) References Cited

U.S. PATENT DOCUMENTS

| 5,519,260 A * | 5/1996 | Washington | ............ B60R 25/04 123/198 DC |
| 2004/0232229 A1 * | 11/2004 | Gotfried | ................ B60R 25/00 235/382 |
| 2008/0252412 A1 * | 10/2008 | Larsson | .................. B60R 25/25 340/5.2 |
| 2012/0226413 A1 * | 9/2012 | Chen | ..................... B60R 16/037 701/36 |
| 2015/0217726 A1 * | 8/2015 | Lee | ........................ B60K 28/02 701/1 |

FOREIGN PATENT DOCUMENTS

KR 10-2004-0022632 3/2018

* cited by examiner

*Primary Examiner* — Tai T Nguyen
(74) *Attorney, Agent, or Firm* — Mintz Levin Cohn Ferris Glovsky and Popeo, P.C.; Peter F. Corless

(57) ABSTRACT

A vehicle is provided that includes an input that receives a temporary user mode command from a user and a detector that detects and acquires biometric information of the temporary user. When the temporary user mode command is input from the user a controller registers the biometric information of the temporary user acquired by the detector and grants an authority for access and operation of the vehicle to the temporary user. Thus, the vehicle may more rapidly grant an authority for the use of the vehicle to a temporary user having an intention of temporarily using the vehicle, and since biometric information of the temporary user is deleted when a predetermined period of time has expired, the risk of the theft is reduced.

16 Claims, 8 Drawing Sheets

VEHICLE AND CONTROL METHOD THEREOF

CROSS-REFERENCE TO RELATED APPLICATION(S)

This application claims the benefit of Korean Patent Application No. 10-2017-0149455, filed on Nov. 10, 2017 in the Korean Intellectual Property Office, the disclosure of which is incorporated herein by reference.

BACKGROUND

1. Field of the Disclosure

The present disclosure relates to a vehicle and a control method thereof, and more particularly, to a technology capable of more rapidly granting a control authority of the vehicle to a temporary user of the vehicle.

2. Description of Related Art

In modern society, automobiles are s common means of transportation. Due to advances in automotive technology, there are many changes in life such as facilitating the long-distance movement. As for the vehicle, a variety of electronics such as a hands-free device, a global positioning system (GPS) receiver, a Bluetooth device, and high-pass device has been developed for the convenience of the driver. Among the automotive technology fields, electric and electronic fields are increasingly generating new value to the vehicles. Also, in recent years, there is an increase in car-sharing in which a number of people share a vehicle and for the car-sharing, a user authentication process is required to prevent the vehicle theft.

The user authentication technique is mainly performed using a primitive authentication method in which an authentication device receives a password from a user through a keypad and matches the password with a pre-stored password, thereby authorizing a user. However, in recent years, due to the development of scientific technology, technologies for identifying or authenticating users using biologic features such as gene traits, fingerprints, voices, veins, facial features, and irises have been developed for more accurate authentication.

Among these methods, a method of using a fingerprint is frequently used as the authentication method. The authentication method of using biometric information is performed such that a user stores user biometric information in a vehicle or a server in advance, and when the user wants to access the vehicle, user biometric information detected by the vehicle is matched with the biometric information stored in the server, thereby completing the user authentication.

However, in this method, when another person other than a vehicle owner is authorized to use the vehicle, it may be required for the other person to proceed with a complex fingerprint registration since the temporary user's fingerprint is not registered. In addition, there is a risk of vehicle theft because the temporary user may access the vehicle arbitrarily until the user of the vehicle deletes the fingerprint of the temporary user from the database after the fingerprint of the temporary user is registered.

SUMMARY

Therefore, an aspect of the present disclosure provides a vehicle capable of rapidly granting an authority for controlling the vehicle for a predetermined period of time, to a temporary user, and capable of reducing the risk of the vehicle theft by restricting the authority the vehicle access when the predetermined period of time is expired. Additional aspects of the present disclosure will be set forth in part in the description which follows and, in part, will be obvious from the description, or may be learned by practice of the present disclosure.

According to an exemplary embodiment, a vehicle may include an input configured to receive a temporary user mode command from a user and a detector configured to detect and acquire biometric information of the temporary user. Additionally, a controller may be configured to register the biometric information of the temporary user acquired by the detector and grant an authority for control of the vehicle, to the temporary user when the temporary user mode command is input from the user. The biometric information may include at least one of fingerprint information, iris information, and face information of the temporary user.

The controller may further be configured to terminate the temporary user mode when a fingerprint registration of the temporary user is not started during a first period of time from when the temporary user mode command is input from the user. The first period of time may be input from the user. The controller may be configured to grant an authority (e.g., access) to allow the temporary user to control the vehicle for a second predetermined period of time to the temporary user.

The vehicle may further include a storage configured to store the registered biometric information of the temporary user. The controller may be configured to delete the biometric information of the temporary user in the storage, when the second period of time has expired from when the controller grants the authority for the control of the vehicle to the temporary user. The controller may further be configured to grant or authorize at least one of an authority for locking or opening a door and a trunk of the vehicle, and an authority for turning an ignition of the vehicle on and off to the temporary user. The second period of time may be input from the user. That is, the user may preset the first and second periods of time.

The controller may be configured to terminate the temporary user mode in response to a command from the user, although the second period of time is not expired. That is, the user may control when to terminate the temporary user mode and override a period of time that was previously set. The input may be disposed in at least one of an ignition button, a fob key, a cluster, a steering wheel, an instrument panel, a door button, and a display within the vehicle. The detector may be disposed in at least one of an ignition button, a fob key, a door, a center fascia, and a steering wheel of the vehicle.

According to another exemplary embodiment, a control method of a vehicle may include receiving a temporary user mode command from a user, detecting and acquiring biometric information of the temporary user and registering the biometric information of the temporary user acquired by the detector, when the temporary user mode command is input from the user, and granting an authority for control of the vehicle to the temporary user. The biometric information may include at least one of fingerprint information, iris information, and face information of the temporary user.

The method may further include terminating the temporary user mode when a fingerprint registration of the temporary user is not started during a first period of time from when the temporary user mode command is input from the user. The first period of time may be input from the user. The granting of the authority for control of the vehicle may include granting an authority configured to allow the temporary user to control the vehicle for a second predetermined period of time to the temporary user.

Additionally, the method may include storing the registered biometric information of the temporary user. The granting of the authority for control of the vehicle may include deleting the biometric information of the temporary user that is stored in the storage, when the second period of time is expired from when the controller grants the authority for the control of the vehicle to the temporary user. The granting of the authority for control of the vehicle may include granting at least one of an authority for locking or opening a door and a trunk of the vehicle, and an authority for turning an ignition of the vehicle on and off to the temporary user.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Exemplary embodiments described in the present disclosure and configurations shown in the drawings are merely examples of the exemplary embodiments of the present disclosure, and may be modified in various different ways at the time of filing of the present application to replace the embodiments and drawings of the present disclosure. Also, the terms used herein are used to describe the embodiments and are not intended to limit and/or restrict the present disclosure.

The present disclosure will now be described more fully with reference to the accompanying drawings, in which exemplary embodiments of the disclosure are shown. In the description of the present disclosure, if it is determined that a detailed description of commonly-used technologies or structures related to the embodiments of the present disclosure may unnecessarily obscure the subject matter of the present disclosure, the detailed description will be omitted. Hereinafter a vehicle to which the present disclosure is applied will be described with reference to FIGS. 1 and 2.

Figure 1:
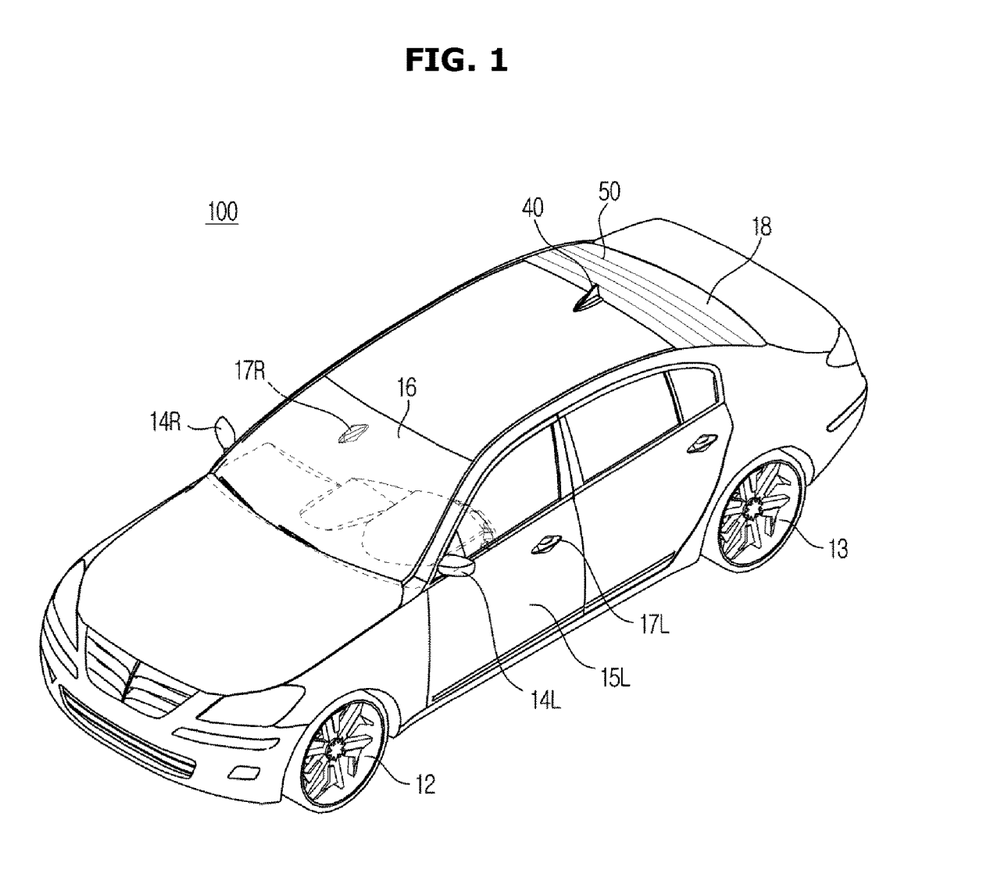
FIG. 1 is an external view illustrating an external appearance of a vehicle according to an exemplary embodiment of the present disclosure.
Figure 2:
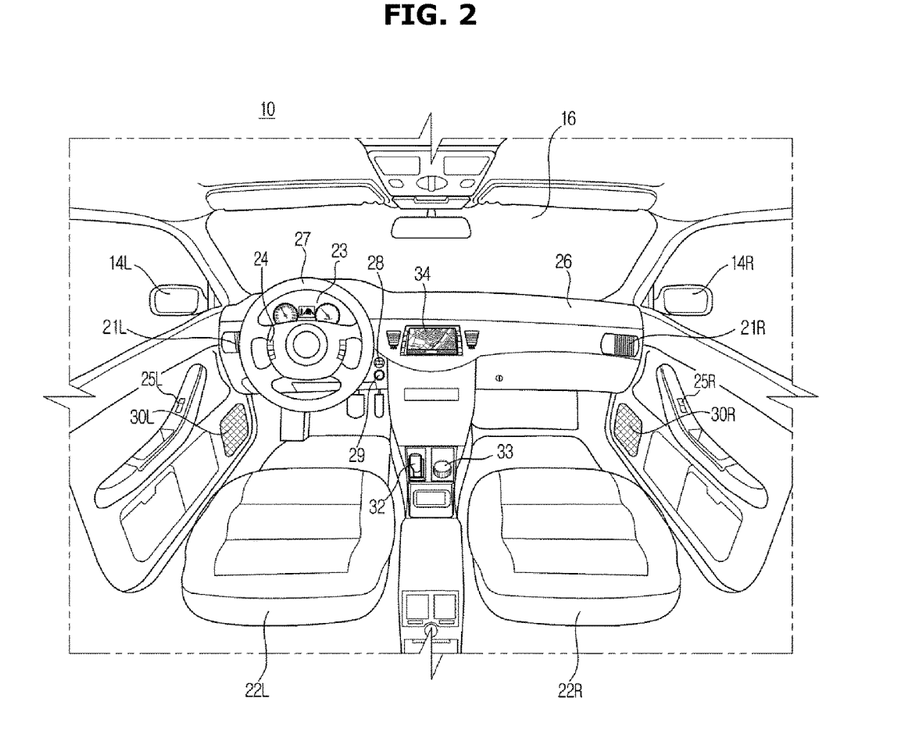
FIG. 2 is an internal view illustrating an internal appearance of the vehicle according to an exemplary embodiment of the present disclosure.

FIG. 1 is an external view illustrating an external appearance of a vehicle according to an exemplary embodiment, and FIG. 2 is an internal view illustrating an internal appearance of the vehicle according to an exemplary embodiment. Hereinafter, a description of the same contents will be described together to prevent duplication.

Referring to FIG. 1, according to an exemplary embodiment, an exterior of a vehicle 100 may include vehicle wheels 12 and 13 that move the vehicle 100, a door 15L and 15R that closes the inside of the vehicle 100 from the outside, a front glass 16 that provides a front view of the vehicle 100 to a driver within the vehicle 100, a rear glass 18 that provides a rear view of the vehicle 100, and side mirrors 14L and 14R that provide a view of a rear side of the vehicle 100 to the driver.

The vehicle wheels 12 and 13 may include a front wheel 12 disposed on a front of the vehicle 100 and a rear wheel 13 disposed on a rear of the vehicle 100. A driving device (not shown) disposed inside of the vehicle 100 may supply a torque to the front wheel 12 and the rear wheel 13 to allow the vehicle 100 to be moved forward and backward. The driving device may employ an engine configured to generate a torque by burning fossil fuel or a motor configured to generate a torque by receiving power source from a capacitor.

The door 15L and 15R may be rotatably disposed on a right side and a left side of the vehicle 100. When the door is opened, a driver may be allowed to be seated within the vehicle 100, and when the door is closed, the inside of the vehicle 100 may be closed from the outside. On the outside of the vehicle 100, a handle 17L and 17R used to open and close the door 15L and 15R may be disposed in the door 15L and 15R, wherein a Bluetooth antenna configured to receive a low frequency signal and a touch detector configured to recognize a user's touch input may be disposed in the handle 17L and 17R. When a user holds or possesses a remote control device (not shown) and when the touch detector of the door 15L and 15R detects a touch input from the user, a controller of the vehicle 100 may be configured to perform an authentication with the remote controller (not shown) via a wireless network, and when the authentication is complete, a door lock of the vehicle 100 may be released and thus when a user pulls the handle 17L and 17R, the door 15L and 15R may be opened. A user is not limited to a driver of the vehicle but also includes a passenger entering the vehicle 100.

Further, the front glass 16 may be disposed on an upper portion of the front of the body to allow a driver inside the vehicle 100 to acquire visual information regarding the front of the vehicle 100 and may be referred to as "windshield glass". The rear glass 18 may be disposed on an upper portion of the rear of the body to allow a driver inside the vehicle 100 to acquire visual information regarding the rear of the vehicle 100. The rear glass 16 may include a rear glass antenna 50 configured to eliminate ice on the glass and configured to communicate with an external base station. An antenna configured to communicate with an external server may be disposed at an upper portion of the vehicle 100. Particularly, as illustrated in FIG. 1, a loop antenna 40 may be provided at a position meeting the rear glass 16.

The side mirrors 14R and 14L may include a left side mirror 14R disposed on the left side of the vehicle 100 and a right side mirror 14L disposed on the right side of the vehicle 100, and may allow a driver inside the vehicle 100 to acquire visual information of the lateral side and the rear side of the vehicle 100. In addition, the vehicle 100 may include a detector, e. g. a proximity sensor configured to detect an obstacle and another vehicle in the rear or lateral side, and a rain sensor configured to detect rain and an amount of rain.

The proximity sensor may be configured to transmit a detection signal to the lateral side or rear side of the vehicle, and receive a reflection signal reflected from an obstacle such as another vehicle. Based on waveform of the received signal, the proximity sensor may be configured to detect whether an obstacle is present at the rear or lateral side of the traveling vehicle, and a position at which an obstacle is located. As an example of such a proximity sensor, a method of transmitting ultrasound or infrared rays and detecting a distance to an obstacle by using ultrasound waves or infrared rays reflected by obstacles may be employed.

Referring to FIG. 2, in the center area of a dashboard 26, an audio video navigation terminal (AVN) having a navigation system may be provided. The AVN terminal may include a display 34 configured to display acquired images or images provided by the terminal. The display 34 may be configured to selectively display at least one of an audio screen, a video screen, and a navigation screen, as well as a screen related to various control screens or additional functions related to the vehicle 100. The display 34 may be implemented by a LCD (Liquid Crystal Display), a LED (Light Emitting Diode), a PDP (Plasma Display Panel), an OLED (Organic Light Emitting Diode), or a CRT (Cathode Ray Tube).

A jog shuttle type-center input 33 may be disposed between the driver seat 22 L and the passenger seat 22 R. A user may input a control command by rotating, pressing the center input 33 or pushing the center input 33 in the up, down, left, or right direction or otherwise engaging the input. The vehicle 100 may include a speaker 30 L and 30 R configured to output a sound. In particular, the speakers 30 L and 30 R may be configured to output a necessary sound to perform an audio function, a video function, a navigation function and other additional functions of the vehicle.

On the dashboard 26 disposed at the side of the driver seat 22L, a key hole 28 to which a remote controller (not shown) e.g., a FOB key, is inserted, may be provided. A remote controller configured to turn a vehicle on may be inserted into the key hole 28. Additionally, an ignition button 29 may be disposed on the dashboard 26 and may be configured to control of turning on and off of the vehicle 100. When the remote controller is inserted into the key hole 28 or when an authentication between the remote controller and the vehicle 100 is successful via a wireless communication network, the ignition of the vehicle 100 may be turned on by pressing or otherwise engaging the ignition button 29 by a user.

The dashboard 26 may further include an instrument panel 23 configured to display various types of driving information of the vehicle 100. A user is capable of checking a state of the vehicle 100 through the instrument panel 23. In addition, a steering wheel 27 configured to adjust a driving direction of the vehicle 100 may be disposed inside of the vehicle 100, wherein various button 24 may be provided on the steering wheel 27 to allow a user to operate the vehicle 100. That is, the buttons or other input types may be provided on the steering wheel to operate various devices within the vehicle such as a navigation system, a radio, a cruise control, or the like.

Furthermore, an air conditioning apparatus may be provided in the vehicle 100 to provide heating and cooling within the vehicle. The air conditioning apparatus may specifically be configured to adjust an internal temperature of the vehicle 100 by discharging heated or cooled air through an air outlet 21 L and 21 R. A door button 25L and 25R configured to control a window of the door 15 may be disposed inside of the door 15 of the vehicle 100. Additionally, a button configured to operate a variety of devices of the vehicle 100 may be disposed in the door button 25L and 25R.

Hereinbefore an external and internal configuration of the vehicle 100 has been described. Hereinafter a configuration and a control method of the vehicle 100 according an exemplary embodiment will be described.

Figure 3:
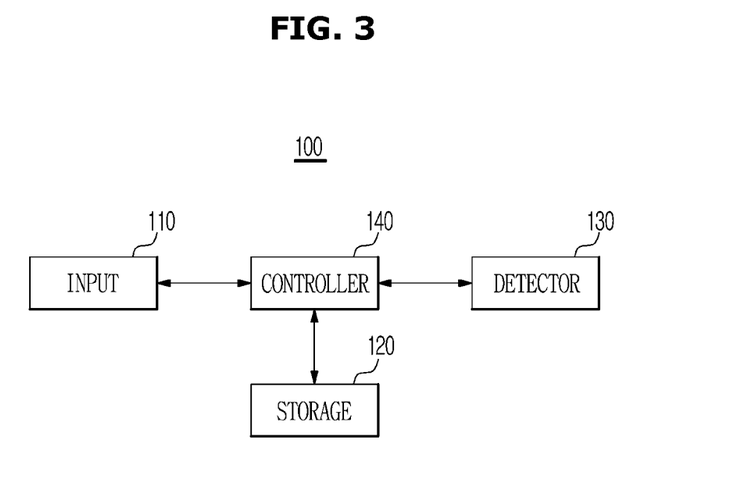
FIG. 3 is a block diagram illustrating a part of a configuration of the vehicle according to an exemplary embodiment of the present disclosure.
Figure 4:
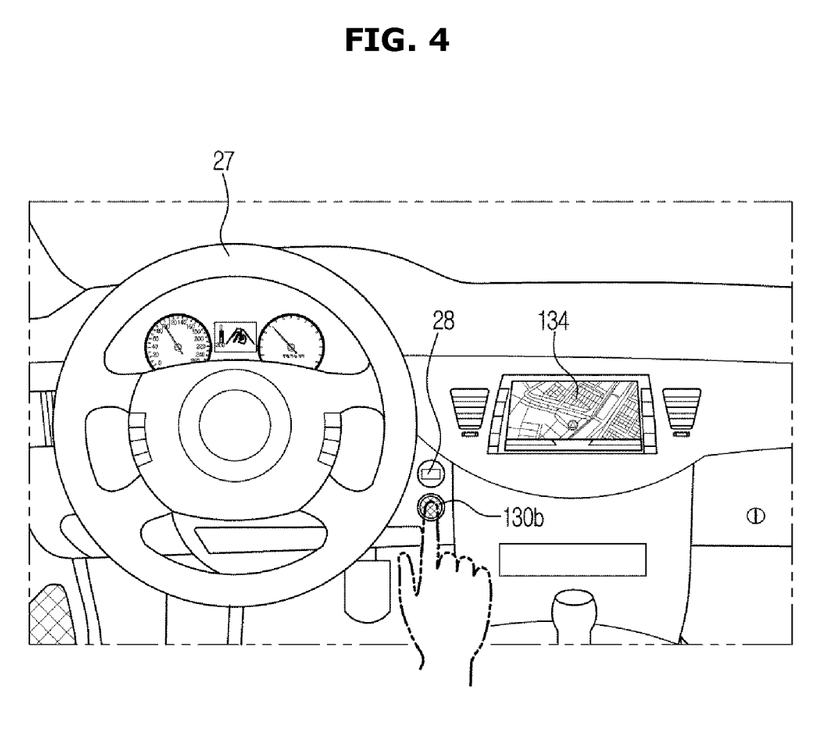
FIG. 4 to 6 are views illustrating a variety of positions in which an input and a detector are provided according to an exemplary embodiment of the present disclosure.
Figure 5:
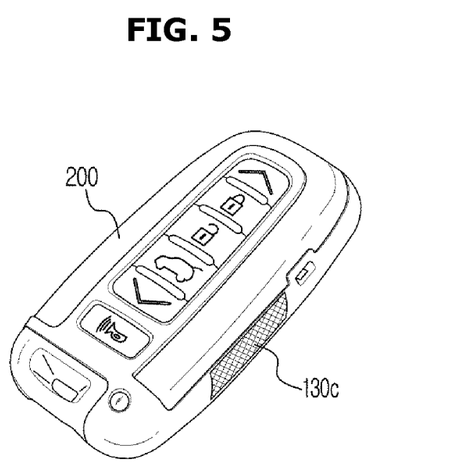
Figure 6:
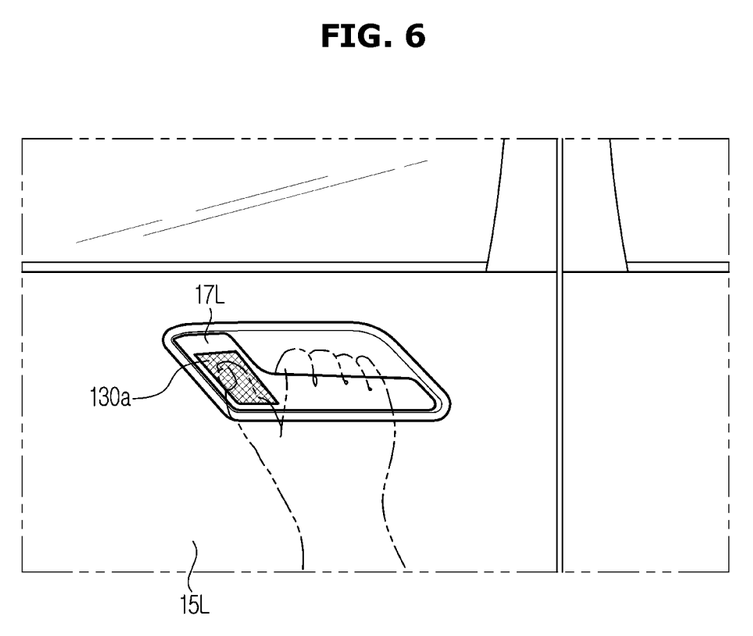

FIG. 3 is a block diagram illustrating a part of a configuration of the vehicle 100 according to an exemplary embodiment, and FIGS. 4 to 6 are views illustrating a variety of positions in which an input 110 and a detector 130 are provided. Referring to FIG. 3, according to an exemplary embodiment, the vehicle 100 may include an input 110 configured to receive a variety of commands from a user, a storage 120 or memory configured to store a variety of information related to a vehicle including biometric information of a user, a detector 130 configured to detect user's biometric information and temporary user biometric information and configured to acquire the biometric information, and a controller 140 configured to operate a variety of devices within the vehicle 100. When a user mode is input from a user at the input, the controller may be configured to perform a registration process of the temporary user biometric information acquired by the detector 130 and grant an authority for operating the vehicle 100 to the temporary user.

In particular, the input 110 may be configured to receive various commands related to vehicle control from a user. For example, the input 110 may be configured to receive a temporary user mode command from a user, which allows a temporary user of the vehicle (e.g., someone other than the primary user) to access and operate the vehicle 100 for a predetermined period of time. To operate the vehicle 100, biometric information which is related to a user to access and operate the vehicle 100 may be stored in a databased within the vehicle 100. However, biometric information related to a temporary user may not be stored in the vehicle 100 since such a user is merely granted access for a limited period of time. Accordingly, the user may selected the temporary user mode through the input 110 to register temporary biometric information.

As illustrated in FIG. 4, the input 110 may be provided in the ignition button 29 or the display 34. In particular, a user may select the temporary user mode command through the input 110. Alternatively, as illustrated in FIG. 5, the input 110 may be provided on one surface of the FOB key 200 and thus a user may select the temporary user mode command through the input 110. The storage 120 may be configured to store a variety of information including user and temporary user biometric information. Particularly, after the temporary user mode is selected, when a temporary user's fingerprint is registered, the storage 120 may be configured to store the registered temporary user biometric information.

The storage 120 may be implemented using at least one of a non-volatile memory element, e.g., a cache, a Read Only Memory (ROM), a Programmable ROM (PROM), an Erasable Programmable ROM (EPROM), an Electrically Erasable Programmable ROM (EEPROM) and a flash memory, a volatile memory element, e.g., a Random Access Memory (RAM), or a storage medium, e.g., a Hard Disk Drive (HDD) and a CD-ROM. The implementation of the storage is not limited thereto. The storage 120 may be a memory that is implemented by a chip separate from the above mentioned processor related to the controller 140, or the storage 120 may be implemented by a single chip with a processor.

Further, the detector 130 may be configured to detect user biometric information and when the biometric information is detected, the detector 130 may be configured to acquire the detected user biometric information. Particularly, when temporary user biometric information is detected using a sensor (not shown) installed in various positions within the vehicle 100, the detector 130 may be configured to acquire the temporary user biometric information from the sensor and transmit the acquired temporary user biometric information to the controller 140. For convenience of description, the user biometric information is described with fingerprints as examples, but is not limited thereto. Alternatively, gene features, voices, veins, facial information, and iris information that illustrate biological features may be included in the biometric information.

The detector 130 may include a variety of devices configured to detect temporary user biometric information and acquire the biometric information. For example, the detector 130 may include a fingerprint sensor configured to acquire user's fingerprint, and a face or an eye ball sensor configured to acquire user's face information, but is not limited thereto. Alternatively, a device configured to acquire user biometric information may be included as a component of the detector 130. Therefore, as illustrated in FIG. 4, the sensor may be disposed above the ignition button 29 of the vehicle 100. As illustrated in FIG. 5, the sensor may be disposed on one lateral side 130*a* of the fob key 200. As illustrated in FIG. 6, the sensor may be disposed on one side 130*b* of the handle 17 of the door 15, and thus the sensor may be configured to detect and acquire temporary user biometric information.

The controller 140 may be configured to operate various devices within the vehicle 100. In particular, when the input 110 receives the temporary user mode command from a user, the controller 140 may be configured to register temporary user biometric information acquired by the detector 130 to the vehicle 100 and grant an authority for accessing and operating the vehicle 100 to a temporary user.

In addition, when the controller 140 grants the authority for accessing and operating the vehicle 100 to the temporary user, the controller 140 may be configured to grant at least one of an authority for locking or opening the door 15 and a trunk of the vehicle 100 and an authority for turning the ignition of the vehicle 100 on and off, to the temporary user. The controller 140 may be implemented using a memory (not shown) configured to store an algorithm for operating components in the vehicle and data related to programs implementing the algorithm, and a processor (not shown) configured to perform the above mentioned operation using the data stored in the memory. The memory and the processor may be implemented in separate chips, or a single chip.

The vehicle 100 may further include the display 34 configured to display the registered result to the outside when the temporary user biometric information is registered by the controller 140. The display 34 may include a display panel (not shown) for the display, wherein the display panel may employ a CRT (Cathode Ray Tube), a LCD (Liquid Crystal Display) panel, a LED (Light Emitting Diode) panel, an OLED (Organic Light Emitting Diode) panel, a Plasma Display Panel (PDP), or Field Emission Display (FED) panel.

Figure 7:
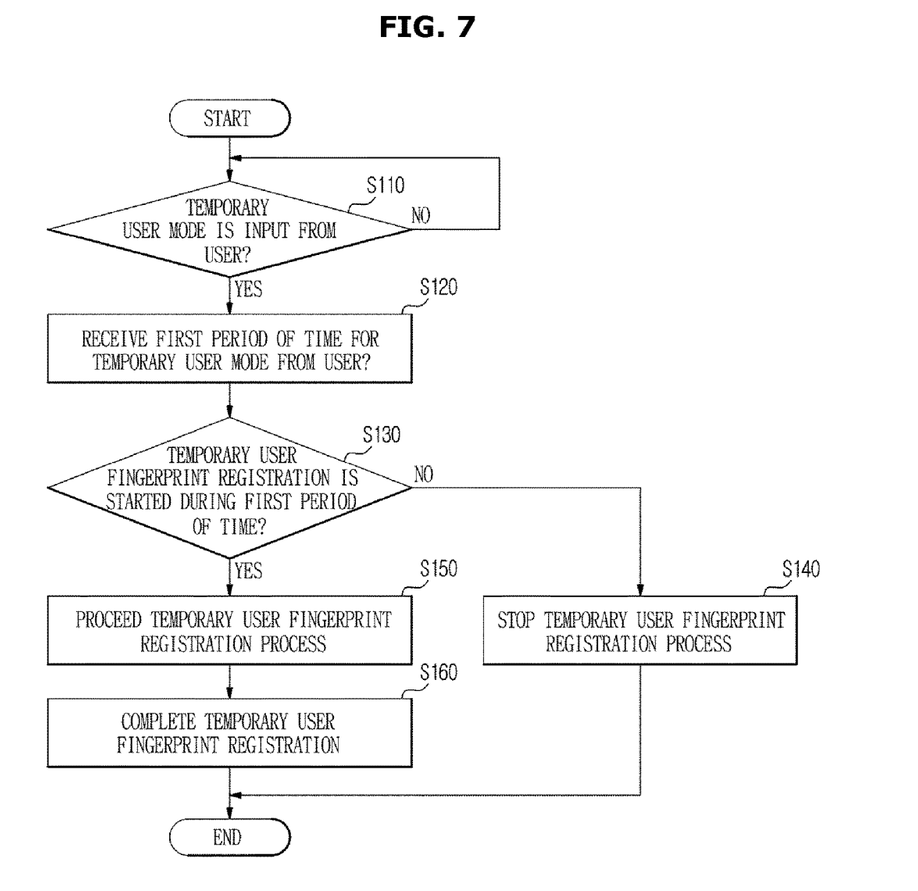
FIG. 7 is a flow chart illustrating a control method of the vehicle according to an exemplary embodiment of the present disclosure.

FIG. 7 is a flow chart illustrating a control method of the vehicle 100 according to an exemplary embodiment. The method described herein below may be executed by the above-described controller having a memory and a processor. FIG. 7 illustrates fingerprint information as an example of biometric information, but the biometric information is not limited thereto, as mentioned above. Alternatively, the biometric information may include a variety of information.

Referring to FIG. 7, the vehicle 100 may be configured to determine whether the temporary user mode is input from a user through the input 110 (110). When the temporary user mode is input from the user, the vehicle 100 may be configured to receive a first period of time for the temporary user mode from the user (120). In other words, the user may set and enter a first period of time at the input. The first period of time represents a period of time in which a temporary user may begin to register biometric information from when the temporary user mode is selected. When a period of time is not set, the risk of theft may occur and thus the vehicle 100 may allow the temporary user to register the biometric information only during the first predetermined period of time. The first period of time may be set as from 1 minute to 5 minutes, but is not limited thereto and may be set for any desired period of time. Alternatively, according to the use environment, the first period of time may be set as various times and the vehicle may receive the period of time from the user.

As illustrated in the drawings, the user may input the first period of time but when the first period of time is set in advance, the step 120 may be omitted and the process may proceed to the next step. When the first period of time is input from the user, the vehicle may be configured to determine whether the fingerprint registration of the temporary user is started during the first period of time (130). When the fingerprint registration of the temporary user is started during the first period of time, the vehicle 100 may proceed with the fingerprint registration process of the temporary user, and complete the fingerprint registration of the temporary user (160). When the fingerprint registration of the temporary user is not started during the first period of time, the vehicle 100 may stop the fingerprint registration process of the temporary user for security purposes to prevent any potential theft or unauthorized vehicle access (170).

Figure 8:
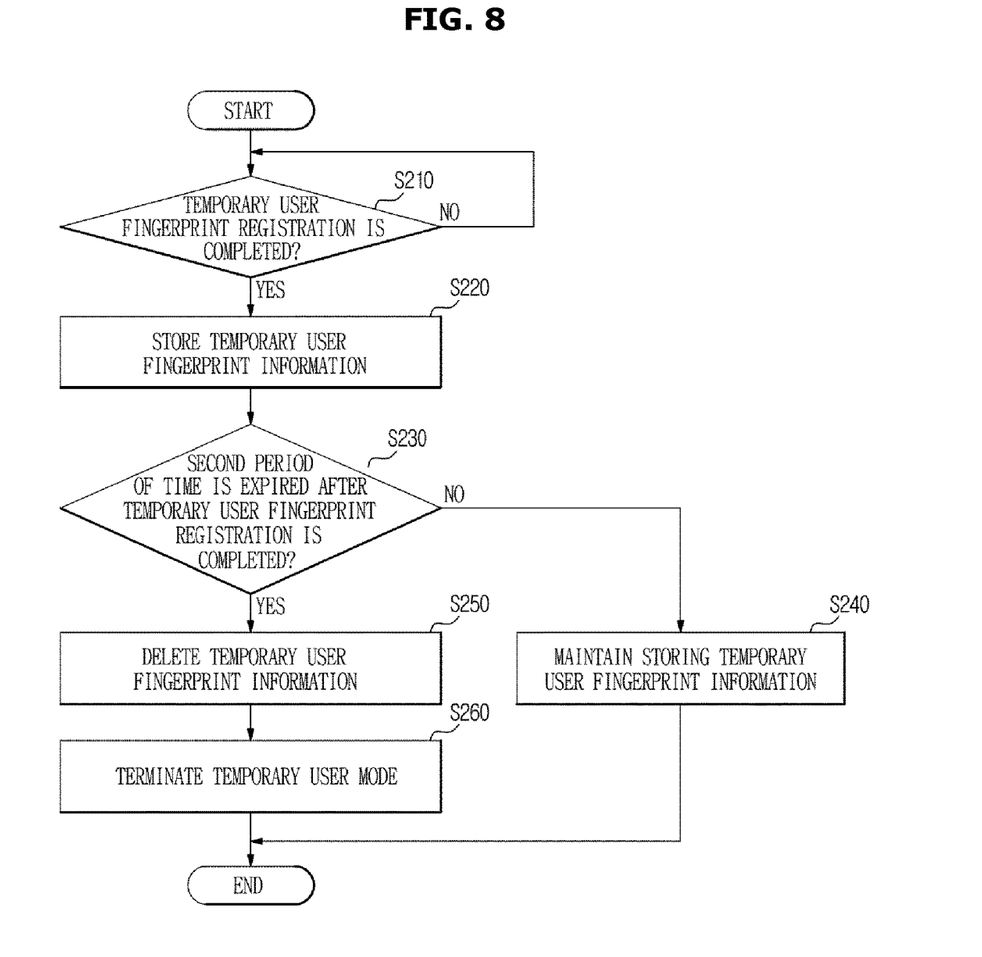
FIG. 8 is a flow chart illustrating a control method of the vehicle according to another exemplary embodiment of the present disclosure.

FIG. 8 is a flow chart illustrating a control method of the vehicle 100 according to another exemplary embodiment. The method described herein below may be executed by the above-described controller having a memory and a processor. Referring to FIG. 8, when the fingerprint registration of the temporary user is complete, the vehicle 100 may be configured to grant an authority for accessing and operating the vehicle 100 to the temporary user while storing the fingerprint information of the temporary user to the vehicle 100 (210 and 220). When the fingerprint registration is complete, the vehicle 100 may be configured to determine whether a second period time has expired or elapsed (230).

The second period of time represents a period of time in which the temporary user may operate the vehicle 100. When the period of time, in which the temporary user may operate the vehicle 100, is not set, the risk of theft may occur and thus the vehicle 100 may allow the temporary user to operate the vehicle only during the second predetermined period of time, although the fingerprint registration of the temporary user is complete. The second period of time may be set as from 1 minute to 5 minutes, but is not limited thereto and may be set for any desired period of time. Alternatively, according to the use environment, the second period of time may be set as various times and the vehicle may be configured to receive the period of time from the user.

When the second period of time has expired or elapsed from when the fingerprint registration is complete, the vehicle 100 may be configured to delete the fingerprint information of the temporary user and terminate the temporary user mode (250 and 260). When the second period of time has not expired from when the fingerprint registration is complete, the fingerprint information of the temporary user may be maintained without being deleted since the temporary user is still authorized to operate the vehicle 100 (240). In other words, the temporary user may maintain access and control of the vehicle until the second period of time has elapsed. Alternately, the primary user may adjust the second period of time to cancel the temporary user mode.

That is, although not shown in the drawing, the user may terminate the temporary user mode even when the second period of time has not expired. Although the second period of time has not expired, the user may terminate the temporary user mode when it is determined that the use of the vehicle by the temporary user is terminated or there is a risk of theft. Since the fingerprint information of the temporary user is automatically deleted when the predetermined period of time has expired (e.g., the second period of time), the theft may be prevented in the future (e.g., upon subsequent attempts at accessing the vehicle).

Hereinbefore the configuration and the control method of the vehicle 100 according to an exemplary embodiment has been described. According to a conventional manner, when an authority for the use of a vehicle is temporarily given to another user, it may be required for the temporary user to proceed with a complex fingerprint registration since the temporary user's fingerprint is not registered in the vehicle system. In addition, there is a risk of vehicle theft since the temporary user has access to use the vehicle arbitrarily until the user of the vehicle deletes the fingerprint of the temporary user after the fingerprint of the temporary user is registered.

However, according to an exemplary embodiment, the vehicle may more rapidly grant an authority for the use of the vehicle, to a temporary user having an intention of temporarily using the vehicle, and since biometric information of the temporary user is deleted when a predetermined period of time has expired, it may be possible to reduce the risk of the theft.

Although a few exemplary embodiments of the present disclosure have been shown and described, it would be appreciated by those skilled in the art that changes may be made in these exemplary embodiments without departing from the principles and spirit of the disclosure, the scope of which is defined in the claims and their equivalents.

What is claimed is:

1. A vehicle, comprising:
   an input configured to receive a temporary user mode command from a temporary user;
   a detector configured to detect and acquire biometric information of the temporary user;
   a controller configured to register the biometric information of the temporary user acquired by the detector when the temporary user mode command is input from the user, and grant an authority for operation of the vehicle to the temporary user; and
   a storage configured to store the registered biometric information of the temporary user,
   wherein the controller is configured to delete the biometric information of the temporary user stored in the storage, when a second period of time elapses from when the controller grants the authority for the operation of the vehicle to the temporary user.

2. The vehicle of claim 1, wherein the biometric information includes at least one selected from a group comprising of: fingerprint information, iris information, and face information of the temporary user.

3. The vehicle of claim 2, wherein the controller is configured to terminate the temporary user mode when a fingerprint registration of the temporary user is not started during a first period of time from when the temporary user mode command is input.

4. The vehicle of claim 3, wherein the first period of time is input from the user.

5. The vehicle of claim 1, wherein the controller is configured to grant an authority to the temporary user to operate the vehicle for the second predetermined period of time.

6. The vehicle of claim 5, wherein the second period of time is input from the user.

7. The vehicle of claim 5, wherein the controller is configured to terminate the temporary user mode in response to a command from the user, although the second period of time has not elapsed.

8. The vehicle of claim 1, wherein the controller is configured to grant at least one of an authority for locking or opening a door and a trunk of the vehicle and an authority for turning an ignition of the vehicle on and off, to the temporary user.

9. The vehicle of claim 1, wherein the input is disposed in at least one selected from a group consisting of: an ignition button, a fob key, a cluster, a steering wheel, an instrument panel, a door button, and a display within the vehicle.

10. The vehicle of claim 1, wherein the detector is disposed in at least one selected from the group consisting of: an ignition button, a fob key, a door, a center fascia, and a steering wheel of the vehicle.

11. A control method of a vehicle, comprising:
receiving, by a controller, a temporary user mode command from a user;
detecting and acquiring, by the controller, biometric information of the temporary user;
registering, by the controller, the biometric information of the temporary user acquired by the detector, when the temporary user mode command is input from the user, and granting an authority for operation of the vehicle to the temporary user; and
storing, by the controller, the registered biometric information of the temporary use,
wherein the granting of the authority for control of the vehicle includes deleting the biometric information of the temporary user that is stored in the storage, when a second period of time has elapsed from when the controller grants the authority to the temporary user for the operation of the vehicle.

12. The control method of claim 11, wherein the biometric information includes at least one from a group consisting of: fingerprint information, iris information, and face information of the temporary user.

13. The control method of claim 12, further comprising:
terminating, by the controller, the temporary user mode when a fingerprint registration of the temporary user is not started during a first period of time from when the temporary user mode command is input.

14. The control method of claim 13, wherein the first period of time is input from the user.

15. The control method of claim 11, wherein the granting of the authority for operation of the vehicle includes granting an authority to the temporary user to operate the vehicle for the second predetermined period of time.

16. The control method of claim 11, wherein the granting of the authority for operation of the vehicle includes granting at least one of an authority for locking or opening a door and a trunk of the vehicle and an authority for turning an ignition of the vehicle on and off, to the temporary user.

* * * * *